March 13, 1928.

A. H. G. FOKKER ET AL

METHOD AND MEANS FOR CONTROLLING AIRCRAFT

Filed March 13, 1926

INVENTORS
Anthony H. G. Fokker
P. Frank Gonrich
BY
P. Frank Gonrich
ATTORNEY

March 13, 1928.
A. H. G. FOKKER ET AL
1,662,306
METHOD AND MEANS FOR CONTROLLING AIRCRAFT
Filed March 13, 1926   3 Sheets-Sheet 2
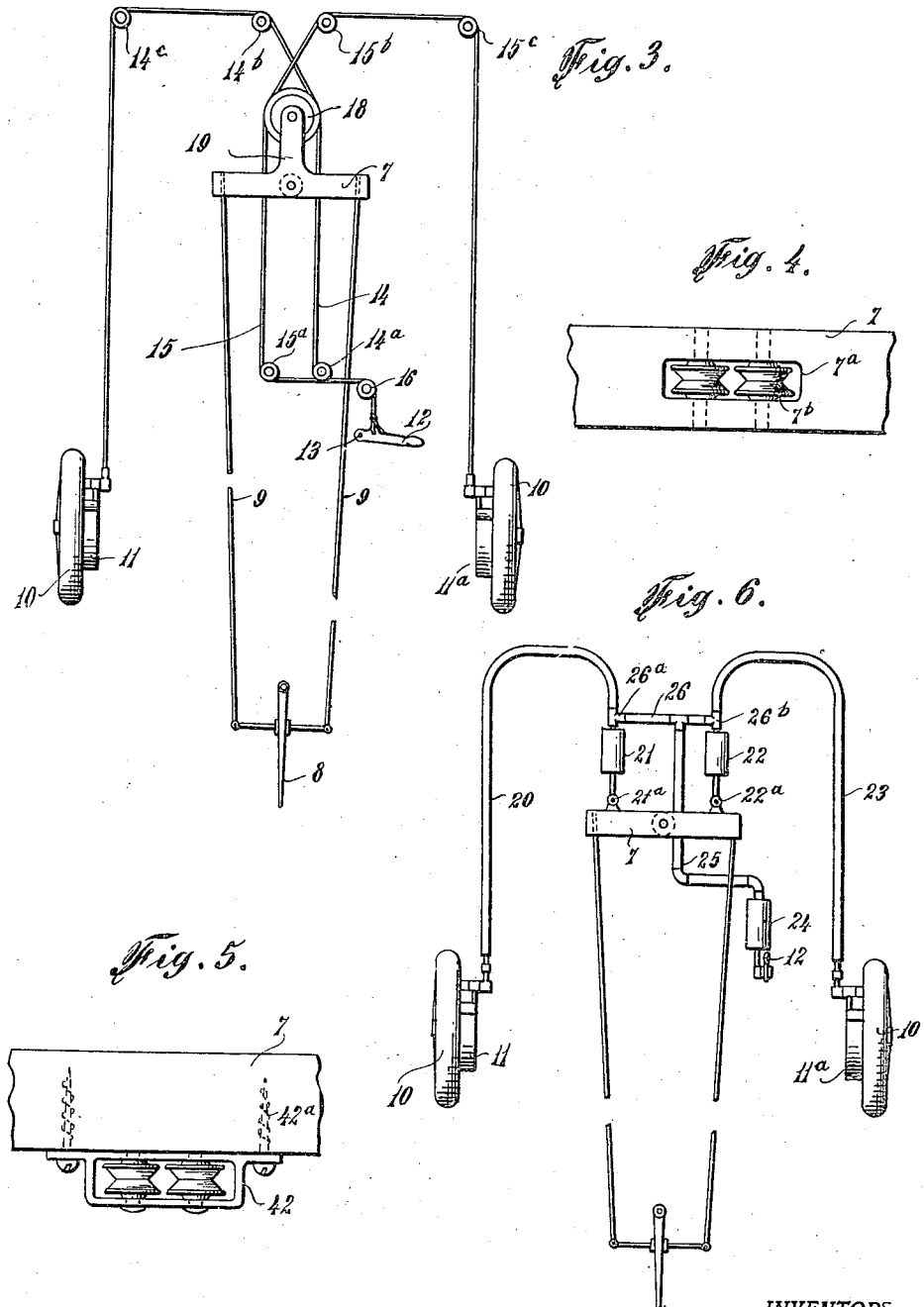

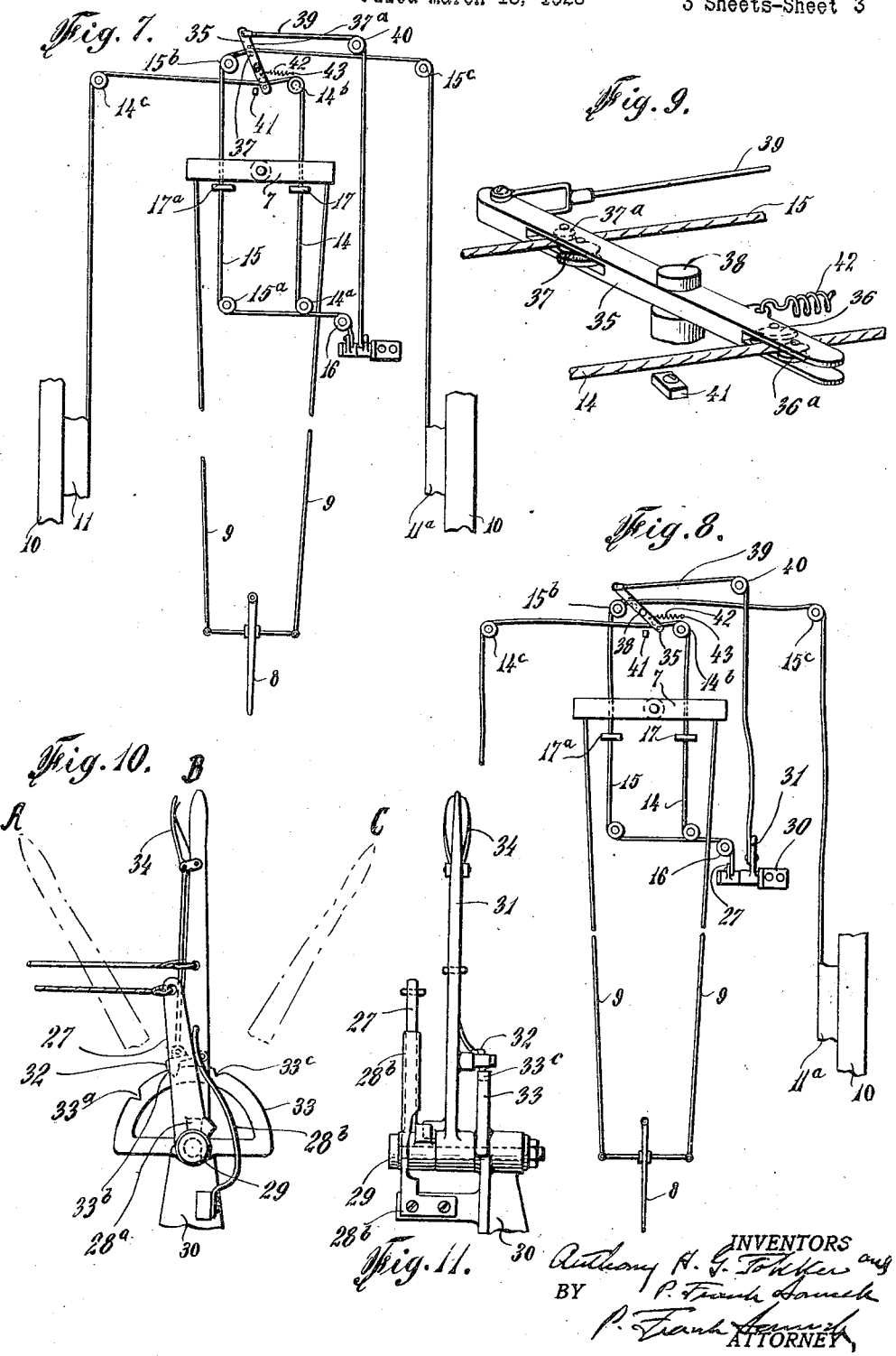

Patented Mar. 13, 1928.

1,662,306

UNITED STATES PATENT OFFICE.

ANTHONY H. G. FOKKER, OF AMSTERDAM, NETHERLANDS, AND PIERRE FRANK SONNEK, OF WOODHAVEN, NEW YORK; SAID SONNEK ASSIGNOR TO SAID FOKKER.

METHOD AND MEANS FOR CONTROLLING AIRCRAFT.

Application filed March 13, 1926. Serial No. 94,368.

The present invention relates generally to improvements in aircraft, and is more especially directed to a method and means of controlling the forward movement or changing the direction of such movement, when the aircraft is traversing the ground or other supporting surface, as in making a landing or preparing to take-off.

As is well known, when an airplane is traveling upon the ground, directional changes in forward movement are attained by the operation of the rudder. In many instances, as in making a landing in a cross-wind, positive control of direction solely through the medium of the rudder is more or less difficult, especially where the rudder must be put hard over to counteract the wind resistance. For example, if it should be desired to make a turn of, say 90°, it may be necessary, in order to overcome the effect of the side forces, to move the rudder through a much greater arc than otherwise, and as the head direction changes, the sudden shifting of the angle of pressure on the tail of the craft, causes it to yaw or continue to turn beyond the desired degree before the rudder functions for recovery, this lack of positive control often resulting in the airplane making a so-called ground loop, with its attendant hazards.

From the foregoing, it will be manifest that to insure greater safety and efficiency in the handling of an airplane or the like, when traversing the ground or other supporting surface, forward motion and directional changes during such movement must be more positively controlled than is now possible with existing means at the disposal of the pilot or aviator, and the general object of the present invention is to provide a method and means of accomplishing this essential improvement in aircraft and mediums for their control, in a simple and economical manner.

More specifically, the object of this invention is to provide a method and means of eliminating the uncertainties which reside in utilizing the existing elements of directional control of an airplane or the like, when traveling upon the ground or other supporting surface, so that the degree of deviation from a straight line in the forward movement of the craft will be entirely under the control of, and at the will of, the pilot or aviator.

It is also an object of this invention to provide a method and means for practicing the same, whereby the invention is readily applicable to aircraft of existing types without effecting changes in their design, so that they will retain their inherent aero-dynamic characteristics, as well as to structures originally designed for the embodiment of this invention therein.

This invention has for a further object the provision of a method and means for changing or correcting the head direction of an airplane when traversing the ground, or other supporting surface, by utilizing forces of inertia set up by the retardation of the forward movement of the craft in the region of its center of gravity, and at a point whereby such forces will act to develop a torque in a direction to augment that created by the concurrent action of the rudder, so that a major turn of the craft on its vertical axis may be made with a relatively inappreciable movement of the rudder, thus permitting the pilot to make a quick recovery and positively control the duration of the turning movement, irrespective of the impinging side forces.

Further, this invention comprehends a method and means for practicing the same, as aforesaid, whereby the required retardative effort may be developed and the movement of the rudder simultaneously effected, by the manual or other actuation of a single control element, means being provided to render said element, effective, at the will of the pilot, in producing only rudder movement.

This invention also contemplates a braking mechanism associated with the wheels of an airplane undercarriage, capable of being functioned to simultaneously act on both wheels, or, selectively, upon one of said wheels, whereby forward motion of the craft in a straight line may be restrained, when it is traversing the ground or the like, or its head direction may be changed, at the will of the operator, it being obvious that a differential in the speed of the wheels will produce the latter result.

Other objects and advantages flowing from the practicing of this invention will doubtless present themselves as the description proceeds, and we would have it clearly understood that we reserve unto ourselves all rights to the full range of equivalents, both in structure and in use, to which we may be entitled under our invention in its broadest aspect.

For the purposes of the present disclosure, we have elected to show schematically, certain means for carrying our invention into effect. However, as will become evident from the specification, these are merely illustrative and in no wise constitute a limitation of the invention, as the method set forth may be practiced by utilizing various arrangements of elements or mechanisms.

In the said drawings:

Figure 3 is a top plan view of a modified form of the invention disclosed in the preceding figures.

Figures 4 and 5 are respectively enlarged sectional views of the foot-bar, showing the cable guiding means associated therewith.

Figure 6 is a top plan view of a further modification, in which the braking mechanisms are power-actuated under the control of the pilot.

Figures 7 and 8 are respectively plan views of another embodiment of the invention, in which means are provided whereby, at the will of the pilot, the foot-bar, when actuated to function the rudder, may be rendered effective or non-effective with relation to the braking mechanisms.

Figure 9 is an enlarged perspective of a detail of the structure of Figures 7 and 8, and Figures 10 and 11 are respectively side and rear views, in elevation, of the levers and co-operating elements shown in Figures 7 and 8.

Figure 1:
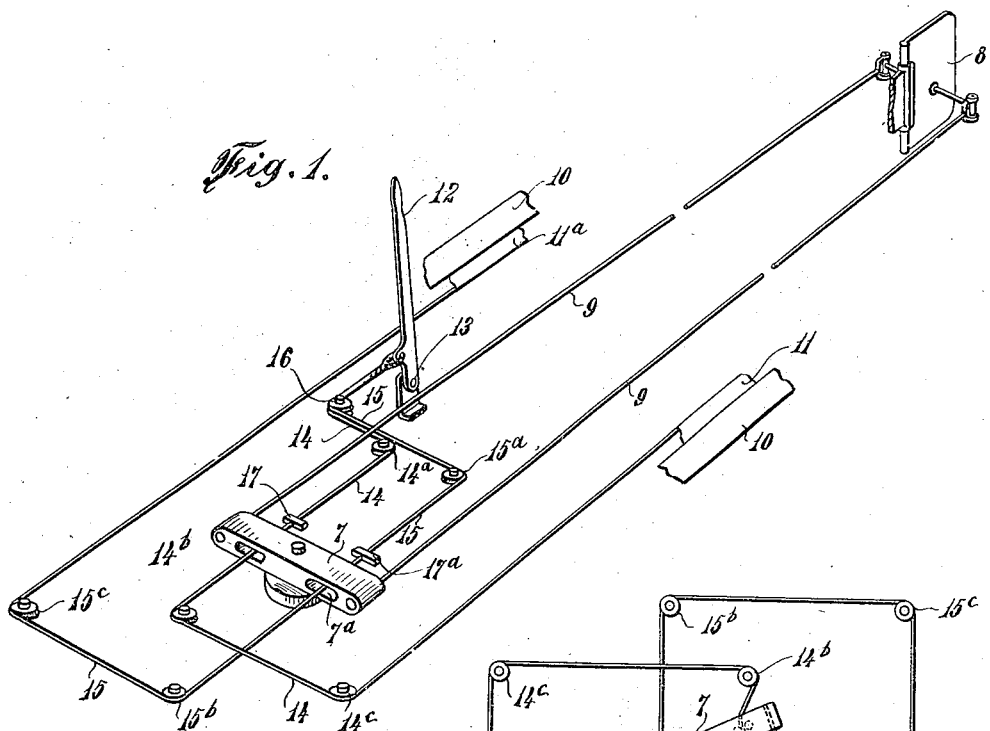
Figure 1 is a view in perspective, showing means of connection between the foot-bar, connected to the rudder, and the respective braking mechanisms of the undercarriage.
Figure 2:
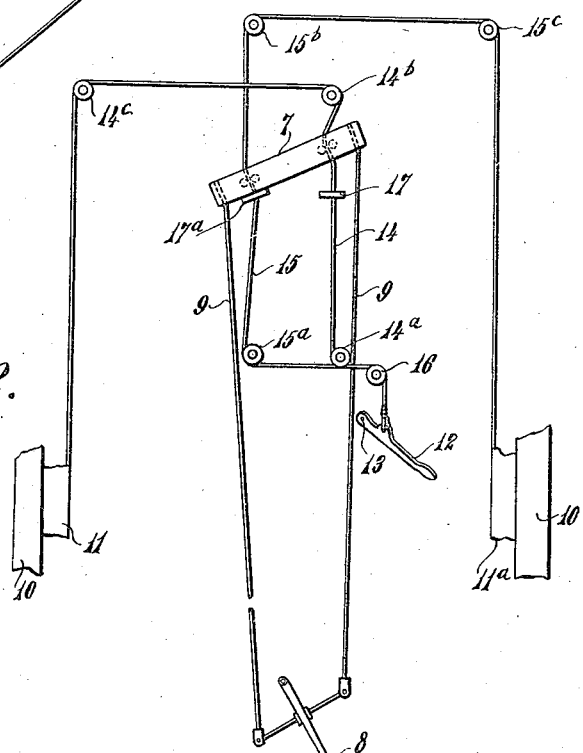
Figure 2 is a top plan view of the layout shown in Figure 1, in which the foot-bar has been rotated to effect a change in the head direction of the aircraft.

Referring now to the drawings in detail, in which like characters of reference are employed to designate similar parts in the several views, and more especially to the embodiment shown in Figures 1, 2 and 4, the usual foot-bar indicated at 7 is pivotally mounted in the cock-pit, convenient to the pilot or aviator, whereby it may be rotated by foot-pressure to actuate the rudder 8, through the medium of the interconnected cables 9.

In the present invention, each of the wheels 10 of the undercarriage is provided with suitable braking mechanism, generally indicated at 11 and 11ª, which may be of the contracting or expanding type, embodying a band or brake shoes, it being manifest that any efficient method or means of retarding the rotation of the wheels 10 now known, or which may be hereafter developed, may be used in practicing this invention.

Located within the cock-pit for convenient manipulation by the pilot or aviator is a lever 12, pivoted at 13, which is connected to the braking means on the respective wheels 10 by the cables or wires 14 and 15, traveling upon the common pulley 16, preferably of the double-groove type, and the respective sets of single groove pulleys 14ª, 14ᵇ, and 14ᶜ and 15ª, 15ᵇ and 15ᶜ.

As will be noted, the aforesaid cables 14 and 15 pass through the foot-bar 7, which is slotted for the purpose, as shown at 7ª and provided with guide pulleys or rollers 7ᵇ, over or between which said cables travel. In lieu of slotting the foot-bar, as at 7ª, a fitting of the type shown at 42 in Figure 5 may be employed which may be fixed to the underside of the foot-bar by means of the screws or the like 42ª, this arrangement being particularly useful where it is desired to utilize existing types of foot-bars which may not be adaptable to slotting.

Each cable 14 and 15, preferably at a point contiguous to and behind the foot-bar, carries a block or other suitable element 17 and 17ª, rigidly fixed thereto, as by a friction clamp or the like, which functions as a stop for engagement by the foot-bar 7 when the latter is rotated for the purposes hereinafter set forth.

From the foregoing, it will be clear that as the cables 14 and 15 are freely movable within the slots 7ª of the foot-bar 7, the braking mechanism for each wheel 10 may be simultaneously functioned to apply the brakes, by the actuation of the hand lever 12 to place said cables under tension; also, that either of the cables 14 and 15 may be functioned independently of the other to render effective the brake to which it is connected, by the movement of the foot-bar 7. The latter operation will be readily apparent from Figure 2, wherein the foot-bar is in the position which it would assume when rotated to warp the rudder 8 for turning the nose of the craft in the direction of the arrow, or to the right, it being obvious that as the right-hand end of the bar is pushed forward, the other end thereof will move rearwardly into contact with the stop 17ª. As this stop is engaged and the cable 15 becomes taut, the continuation of the movement of the foot-bar functions the braking mechanism 11 to which said cable is connected, the braking mechanism for the opposite wheel remaining ineffective or neutral as the foot-bar rides freely upon its cable 14.

Manifestly, the retardation of the rotation of one of the undercarriage wheels 10 in conjunction with the simultaneous actuation of the rudder 8 toward that side on which the braking effort is applied will produce a change in the head direction, the extent and duration of which may be positively governed by the pilot or aviator by the intermittent or gradual actuation of the brake and rudder, as may be desired or necessary, the rotative movement of the rudder in the execution of a turn 90°, for instance, being through a much smaller arc than would be the case where the turning effort is solely dependent upon the rudder action, as at present. Therefore, it will be evident that a quicker and more complete recovery may be attained generally, the relatively slight rudder movement required enabling the operator of the aircraft to readily counteract the effects of the side forces where so-called cross-winds prevail. In other words, under present conditions, in order to make a turn in a cross-wind, the rudder must be moved through a wide arc to overcome the wind resistance, and as the head-direction changes, the sudden shift in the angle of the impinging side forces causes the tail to veer widely in response to the rudder effort, the impetus being such that the recovery action of the rudder is largely, if not wholly, nullified. With a slight canting of the rudder and the utilization of controlled forces of inertia, as in this invention, the effect of the side forces is rendered negligible.

In Figure 3, the cables 14 and 15 pass beneath the foot-bar 7 for engagement with the preferably double-groove pulley 18 carried by the arm or extension 19 at the forward edge of said foot-bar. As will be observed, the said cables are crossed beyond the pulley 18, and traverse the pulleys 14$^a$, 14$^b$ and 14$^c$ and 15$^a$, 15$^b$ and 15$^c$ for connection to the braking devices 11 and 11$^a$ respectively, as in the embodiment previously described. It will be evident that the movement of the foot-bar to advance the right-hand end thereof will shift the center of the pulley 18 to the left, resulting in the gradual tightening of the cable 15 and the application of the braking mechanism 11$^a$ to which it is connected. Advancement of the left-hand end of the foot-bar in the same way effects the functioning of the braking devices 11.

In the embodiment shown in Figure 6, the braking effort is developed by fluid or gaseous actuated means in response to the movement of the foot-bar, suitable tubing 20 connecting the braking element 11 to the control unit 21, while the remaining braking mechanism 11$^a$ is similarly connected to the control unit 22 by the tubing or piping 23. Each of these control units 21 and 22, which may be compressors, pumps, fluid or gas reservoirs, or other types of power developing or applying devices or elements, is connected to the foot-bar 7 by pivotal connections or otherwise, as shown at 21$^a$ and 22$^a$.

A suitable control unit 24 having communication with the lines 20 and 23 through the medium of the tubing 25 and 26, is adapted to be functioned by the actuation of the lever 12. Suitable so-called one-way valves, generally indicated at 26$^a$ nd 26$^b$ are installed within the union or other connection between the tubing 26 and the lines 20 and 23.

In operation, the movement of the lever 12 will build up or liberate a force which will be transmitted through the tubing 25 and 26, past the valves 26$^a$ and 26$^b$ and through the lines 20 and 23, for the simultaneous application of the brakes to both wheels 10. However, when the rudder is moved by the actuation of the foot-bar 7 only one of the braking mechanisms is applied. For instance, if the right-hand end of the foot-bar is advanced, the unit 22 will function to provide for the transmission of energy through the line 23 to the brake 11$^a$, the valve 26$^b$ which remains seated, preventing the escape or diversion of the energy into the tubing 26, while the unit 21 is rendered ineffective by the rearward movement of the end of the foot-bar to which it is attached. The forward movement of the left-hand side of the foot-bar will, of course, result in the application of the braking mechanism 11 while the means 11$^a$ remain inoperative. Obviously, any suitable arrangement of the power applying or developing devices may be used, and, if desired, means may be provided for permitting of a limited free or unrestricted movement of the foot-bar in conjunction with the rudder before the foot-bar begins to function as an actuator or controller of the power transmitting elements. Also, in lieu of the lay-out shown, a three-way valve mechanism may be used, whereby an actuating force may be admitted to both lines 20 and 23 from a suitable reservoir, by the actuation of the lever 12, or to either of them, upon the movement of the foot-bar 7. Such a valve mechanism could be located in advance of the foot-bar to keep the lines 20 and 23 as short as possible and have suitable connections to the lever 12 and to the foot-bar 7. The specific relative arrangement of the various elements, manifestly, is a matter of practicability and convenience in construction and operation.

As will be evident from the description of Figures 1 and 2, the stops 17 and 17$^a$ are normally in spaced relation to the foot-bar 7, so that the latter is capable of a slight movement before engaging with one or the other of them, but in maneuvering an airplane in flight, the movement of the foot-bar is usually sufficient to engage one of the stops and thereby actuate the interconnected elements of one of the braking mechanisms. Therefore, in addition to that required for warping the rudder in opposition to the aero-dynamic forces, the pilot must put forth enough physical effort to function the braking mechanism, irrespective of the fact that the braking effort is of no value. This operation of a braking mechanism each time that the foot-bar is moved to change or correct the flight direction, may, or may not, be objectionable, depending largely upon the means employed for practicing the invention and the adaptability of the pilot to the differential in the responsiveness of the foot-bar to foot-pressure.

To insure against any possible loss in efficiency in handling an airplane in which this invention is incorporated, a further modification is shown in Figures 7 to 11, inclusive, whereby the foot-bar may be rendered effective and non-effective with relation to, and for functioning, the braking mechanisms for the respective wheels of the undercarriage, at the will of the operator of the craft.

In Figure 8, the normal relationship of the cooperating elements is clearly shown, the cables 14 and 15, passing through the slots 7ª of the foot-bar and traveling upon the respective sets of pulleys, as in the preceding showing, being of a length whereby they will remain slack during the movement of the foot-bar, irrespective of its engagement with one or the other of the stops 17 and 17ª, carried by said cables. These cables are led over a common pulley 16 for connection to the short lever 27, the hub 28 of which is rotatably mounted upon the shaft 29 supported in the bracket 30, the said hub having a peripheral lug or projection 28ª, the purpose of which will hereinafter become apparent. Also rockably mounted on the shaft 29, and concentric with the lever 27, is a hand lever 31, which carries a gravity, or a spring actuated pawl 32 pivoted thereto at 32ª for engagement with the notches 33ª, 33ᵇ and 33ᶜ of the sector 33 supported by said bracket 30. Any suitable hand-operated release mechanism, such as indicated at 34, may be utilized for disengaging the pawl from the notch in which it may be seated.

As will be noted, the pulleys 14ᵇ and 14ᶜ are on a line parallel to that upon which the pulleys 15ᵇ and 15ᶜ are located. Pivotally mounted between these lines, as at 38, preferably adjacent the pulleys 14ᵇ and 15ᵇ, is a tensioning or take-up device comprising a bar-like member 35, the ends of which are formed with jaws or otherwise shaped to provide suitable bearings for the respective pulleys 36, 36ª and 37 and 37ª. A cable or wire 39, fastened to the said member 35 adjacent one end thereof, passes over the pulley or roller 40 for connection to said lever 31, as at 31ª, it being obvious that the take-up device may be rocked in opposition to the spring 42 connected thereto and at a fixed point 43, by the movement of the lever 31.

Under flight conditions, the hand lever 31 is set at its forward position, as at A in Figure 10, with the pawl 32 in engagement with the notch 33ª. This permits the take-up to move in response to the contraction of the spring 42 to a position in which it is non-effective with relation to the cables 14 and 15 which are respectively retained between the cooperating sets of pulleys or rollers 36 and 36ª and 37 and 37ª. (See Figure 8). The lever 27 is also at its limit of forward movement, as shown in full lines in Figure 10, so that the cables 14 and 15, which are no longer under tension, become slack upon their respective supports. It will be evident that with the various parts in the positions described, the foot-bar 7 may be rotated in either direction for the actuation of the rudder, without functioning either of the braking mechanisms, as the slack in each cable is ample to compensate for any movement thereof by reason of the engagement of the foot-bar with either of the stops 17 and 17ª. Therefore, the responsiveness of the rudder is the same as would obtain, were the braking mechanisms and their operating elements omitted from the structure.

When about to land, the hand lever 31 is drawn back to the vertical, as at B in Figure 10, the pawl 32 dropping into engagement with the notch 33ᵇ. This movement of the hand lever, through the medium of the interconnecting cable or wire 39, rotates the take-up member 35 in opposition to its spring 42 and places the cables 14 and 15 under tension, these cables riding respectively upon the take-up pulleys 36 and 37 (see Figure 7). The movement of the foot-bar into engagement with either of the stops 17 and 17ª will now function one or the other of the braking mechanisms, as and for the purposes explained in connection with the description of the preceding figures of the drawings.

As will be noted, with the hand lever 31 in its vertical position, its lug 31ª abuts upon the lug 28ª on the hub of the lever 27, so that the brakes may be simultaneously applied to both wheels of the undercarriage by the backward movement of the hand lever 31, it being obvious that the inter-engagement of the lugs of the two levers 27 and 31 will cause them to travel as a unit. When the craft is at rest upon the ground, the brakes may be maintained in functioning relation by the engagement of the pawl 32 with the last notch 33ᶜ, the lever 31 assuming the position indicated at C in Figure 10. The rearward movement of the lever 31 past the vertical, in addition to actuating the lever 27, will slightly increase the tension upon the cables 14 and 15 by the corresponding action of the take-up, the movement of the latter beyond a predetermined point, however, being limited by a suitable fixed stop 41.

While this invention has been described more or less specifically with reference to the arrangements shown, it is again pointed out that the showing is merely illustrative and that the invention may be practiced in many ways, utilizing any form of power for application of the brakes and for controlling the effectiveness of such power in synchronism with the rudder movement, all of such modifications or embodiments whereby the objects hereinbefore set forth may be attained falling within the spirit and scope of this invention as defined by the appended claims.

What is claimed is:

1. The combination with an airplane having a vertical rudder and a landing gear, of a braking mechanism associated with said landing gear, foot actuated means, cables connecting said foot-actuated means to said rudder, whereby the latter may be actuated to change the head direction of the airplane, means independent of each foot actuated means for functioning said braking mechanism, said means including normally slack cables connected to said braking mechanism and a tensioning device associated with said cables, hand actuated means connected to said tensioning device and operable to place said brake mechanism cables under tension, and means concurrently operable to render said brake mechanism actuatable by the movement of said foot actuated means.

2. The combination with an airplane having a vertical rudder and a landing gear, of a braking mechanism associated with said landing gear, a foot-bar, cables connecting said foot-bar to said rudder, means independent of said foot-bar for functioning said braking mechanism, said means including normally slack cables and a tensioning device associated therewith, a lever connected to said tensioning device and operable to place said brake mechanism cables in tension, means on said brake mechanism cables adapted for engagement by said foot-bar and means operable by the movement of said lever to render the means on said brake mechanism cables capable of engagement by said foot-bar to permit of the application of the braking mechanism by the movement of said foot-bar.

3. A means for applying braking effort to the wheels of an airplane landing gear, including a foot-bar, a hand-operated lever located at a point remote from said foot-bar, a second lever associated with said hand-operated lever, cables, normally slack, connecting said second lever to each of a pair of brakes effective upon the wheels of said landing gear, devices on said cables normally independent of said foot-bar and adapted for engagement thereby, a tensioning device associated with said cables and means of connection between said device and said hand-operated lever whereby said cables may be placed in tension to render the devices on said cables capable of engagement by said foot-bar to permit of the functioning of the braking mechanism by the movement of said bar.

4. A means for rendering the braking mechanism of an airplane landing gear operative in response to the movement of a normally independent vertical rudder control element, including a hand-lever, a second lever associated therewith, cables connecting said second lever to the braking mechanism, devices on said cables adapted for engagement by said element and means for moving said devices into position for engagement by said element by the actuation of said hand-lever, whereby the braking mechanism at either side of the landing gear may be functioned by the movement of said element, said hand-lever being further operable to simultaneously apply the braking mechanism to both sides of the landing gear and independently of the movement of said element.

5. A means for rendering the braking mechanism of an airplane landing gear operative in response to the movement of a normally disassociated vertical rudder control element, including cables connected to the brakes at each side of the landing gear, a device adjustably mounted on each of said cables for engagement by said element and means connected to said cables and operable at the will of the pilot of the airplane to move said devices into position relative to said element, whereby said element may engage said devices to permit of the selective operation of said braking mechanism by the movement of said element.

ANTHONY H. G. FOKKER.
P. FRANK SONNEK.

CERTIFICATE OF CORRECTION.

Patent No. 1,662,306. Granted March 13, 1928, to

ANTHONY H. G. FOKKER ET AL.

It is hereby certified that error appears in the printed specification of the above numbered patent requiring correction as follows: Page 5, line 30, claim 1, for the word "each" read "said"; and that the said Letters Patent should be read with this correction therein that the same may conform to the record of the case in the Patent Office.

Signed and sealed this 3rd day of April, A. D. 1928.

Seal.

M. J. Moore,
Acting Commissioner of Patents.